United States Patent [19]

Greif et al.

[11] 4,038,296

[45] July 26, 1977

[54] ALKYLENE OXIDE DERIVATIVES BASED ON POLYTETRAHYDROFURAN COPOLYMERS

[75] Inventors: Norbert Greif, Ludwigshafen; Heinz Bille, Limburgerhof; Rolf Fikentscher, Ludwigshafen; Toni Simenc, Mannheim, all of Germany

[73] Assignee: BASF Aktiengesellschaft, Ludwigshafen (Rhine), Germany

[21] Appl. No.: 538,453

[22] Filed: Jan. 3, 1975

[30] Foreign Application Priority Data

Jan. 16, 1974  Germany .............................. 2401855

[51] Int. Cl.$^2$ .................... C07C 43/04; C07C 69/22; C07C 69/58
[52] U.S. Cl. .............................. 260/410.6; 260/615 B; 252/8.9
[58] Field of Search ........................... 260/410.6, 615 B

[56] References Cited

U.S. PATENT DOCUMENTS

| 2,533,323 | 12/1950 | Lomartire | 260/410.6 X |
|---|---|---|---|
| 2,599,803 | 6/1952 | Ballard et al. | 260/410.6 X |
| 3,425,999 | 2/1969 | Axelrood et al. | 260/615 B X |
| 3,539,519 | 11/1970 | Weimer | 260/615 B X |
| 3,577,559 | 5/1971 | Horsley | 260/410.6 |

FOREIGN PATENT DOCUMENTS

| 1,120,139 | 12/1961 | Germany | 260/615 B |
|---|---|---|---|
| 211,429 | 2/1968 | U.S.S.R. | 260/615 B |

*Primary Examiner*—Patrick P. Garvin
*Attorney, Agent, or Firm*—Keil, Thompson & Shurtleff

[57] ABSTRACT

Alkylene oxide derivatives based on tetrahydrofuran copolymers and having the formula R-X, wherein X consists essentially of a copolymer of tetrahydrofuran and a $C_2$ to $C_3$ alkylene oxide, R being the radical of a $C_8$ to $C_{22}$ alcohol or carboxylic acid or their oxyalkylation products with from 1 to 20 moles of said $C_2$ to $C_3$ alkylene oxide, the total amount of the alkylene oxide and tetrahydrofuran units in R-X being from 60 to 95% by weight and the molar ratio of the alkylene oxide units to tetrahydrofuran units being from 1:0.5 to 1:3. The new products R-X are useful as surfactants, textile auxiliaries and, in particular, emulsifiers in the one-bath finishing and pigment dyeing of textiles.

10 Claims, No Drawings

ALKYLENE OXIDE DERIVATIVES BASED ON POLYTETRAHYDROFURAN COPOLYMERS

It is known that provided the conditions are not particularly energetic, alcohols do not participate in the polymerization reaction of tetrahydrofuran, as can be seen, e.g., from Houben-Weyl, vol. XIV/2, page 560. Only under very energetic conditions has an addition reaction of tetrahydrofuran with alcohols and phenols proved possible (U.S. Pat. No. 2,605,292 and German Pat. No. 894,110). The reaction requires temperatures about 150° C, and when using zinc chloride as the catalyst, even temperatures above 260° C.

On the other hand, it is known from German Pat. No. 1,120,139 that low molecular weight alcohols can be used as molecular weight regulators when preparing low molecular weight tetrahydrofuran/ethylene oxide copolymers. The said patent does not indicate what role the alcohol actually plays in this reaction and whether it is incorporated into the copolymer molecule at all. Uses recommended for the copolymers in the said patent are as lubricating oils or heating fluids.

We have now found that, surprisingly, longer-chain alcohols and carboxylic acids and their oxyalkylation products can react with tetrahydrofuran in the course of the preparation of copolymers of tetrahydrofuran with ethylene oxide and/or propylene oxide and that the products thus obtained are excellent textile auxiliaries and good surfactants.

The invention relates to polyalkylene oxide adducts of the formula wherein R is the radical of an alcohol of 8 to 22 carbon atoms, the radical of a carboxylic acid of 8 to 22 carbon atoms, or the radical of their reaction products with from 1 to 20 moles of ethylene oxide and/or propylene oxide, and X is the radical of a copolymer of ethylene oxide and/or propylene oxide and tetrahydrofuran, with the proviso that the total amount of alkylene oxide units in R — X is from 60 to 95 per cent by weight, based on the end product R — X, and that the molar ratio of epoxide units to tetrahydrofuran units is from 1:0.5 to 1:3.

Starting materials for the manufacture of the compounds according to the invention are alcohols of 8 to 22, preferably of 8 to 18, carbon atoms or their mixtures, amongst which the oxo-alcohols of 9 to 11 carbon atoms, and of 12 to 15 carbon atoms, should be mentioned particularly. Further starting materials are saturated or unsaturated carboxylic acids of a corresponding number of carbon atoms, above all the naturally occurring fatty acids, such as oleic acid, stearic acid or their mixtures. Examples of further fatty acids are coconut fatty acid, palm oil fatty acid and tallow fatty acid. Finally, the adducts of from 1 to 20, preferably from 1 to 10, moles of ethylene oxide or propylene oxide with the said alcohols or carboxylic acids can also be used as starting materials.

The starting materials are reacted with a mixture of tetrahydrofuran and ethylene oxide and/or propylene oxide in the presence of Lewis acids, such as boron fluoride or its addition products, hexachloroantiomonic acid, tin tetrachloride, zinc chloride, aluminum chloride or aluminum bromide, at temperatures of from 0° to 120° C. The amounts of epoxide units and tetrahydrofuran units in the copolymer should be such that their sum accounts for from 60 to 95, preferably from 70 to 90, per cent by weight of the end product R — X. Amounts outside this range are unsuitable since such adducts no longer show good application properties. Preferably, from 5 to 20 moles of ethylene oxide and from 5 to 15 moles of tetrahydrofuran are employed per mole of alcohol or carboxylic acid.

An advantageous method of preparing the products is to dissolve the alcohol, the carboxylic acid or their oxyethylation products, which are to be reacted, in tetrahydrofuran, to add from 0.1 to 2 per cent by weight, based on the starting compound, of the Lewis acid, preferably boron fluoride etherate, and to introduce ethylene oxide and/or propylene oxide dropwise slowly at from 0° to 120° C, preferably from 40° to 100° C, whilst stirring, until the reaction product is water-soluble. The reaction is then allowed to continue further for from 5 to minutes to 10 hours, preferably for about 30 minutes. At that stage, the ethylene oxide and propylene oxide have been converted quantitatively, the tetrahydrofuran and the alcohol have been converted except for a few per cent, and the carboxylic acid employed as an alternative to the alcohol has as a rule been converted to the extent of about 70%. Unconverted constituents do not interfere and therefore as a rule need not be removed.

The new materials can be characterized by their OH-numbers and their average molecular weights.

We have also found that the compounds according to the invention are excellent surfactants and textile auxiliaries. In particular, they act as softeners when applied in various ways, for example during washing, during finishing or during dyeing and bleaching.

A particularly advantageous special field of application of these agents is the one-bath simultaneous pigment dyeing and finishing of textile materials.

In general, this process is carried out in the presence of film-forming copolymers (which act as binders for the pigments), and hitherto a very objectionable feature has always been that the filmforming copolymers tend to agglomerate on the pad rollers. We have found that because of their excellent emulsifying action the alkylene oxide derivatives of the invention can substantially prevent the formation of coatings of the film-forming copolymers on the rollers. The formation of coatings on the rollers is a serious problem in one-bath pigment dyeing and finishing since in some cases the entire process becomes unreliable. In practice, this objectionable phenomenon depends on a complex of factors, for example on the shear forces resulting from the pressure, width, hardness and diameter of the rollers, on the roller speed, on the swelling and sorption properties of the textile fibers and on the dispersing agents, wetting agents, chemical structure of the binders and other factors.

During the dyeing and finishing process, these agglomerates can easily detach from the rollers and deposit on the textile web, resulting in irreparable blotching. Hitherto, products which are mostly plasticizers and emulsifiers have been used to prevent the formation of such deposits on the rollers. Examples of materials which have been chosen are quaternary ammonium compounds manufactured by reaction of tertiary amines with epoxides, such as 1,2-epoxyoctadecane, as well as fatty acid chloroalkylamides, ester-like condensation products of high molecular weight fatty acids and hydroxyalkyl derivatives, alkylarylsulfonates, oxyethylation products, such as, e.g., nonylphenol oxyethylates and fatty alcohol derivatives, but a feature common to all these products was that whilst they exhibited one or other of the desired properties they were unable to meet all requirements equally. For example, whilst some products foamed excessively, interference with the dyeing process frequently had to be taken into consideration with other products.

Using the alkylene oxide derivatives of the invention it is now possible to solve the entire problem. Particularly suitable agents for this special purpose are those wherein the starting materials oleic acid, ethylene oxide and tetrahydrofuran are in a weight ratio of 1: (1.5 to 2.5). : (1.5 to 3). A ratio of 1 : (1.6 to 1.8) : (2.0 to 3) proved particularly valuable in industrial operation.

The agents according to the invention, and in particular the oleic acid/ethylene oxide/tetrahydrofuran adducts defined above, also are excellent softeners and means of improving the hand, in the above special application. Hitherto, no products were known which when used in one-bath pigment dyeing and finishing prevented deposits on the rollers and at the same time exerted a comparably advantageous effect on the hand of the textiles thus treated, without producing any adverse effects whatsoever in other respects.

The liquor to which the agents according to the invention are added, e.g. for pigment dyeing and finishing, preferably consists of a pigment, an aqueous dispersion of film-forming copolymers, e.g. based on acrylates, as binders, a catalyst, such as, e.g., magnesium chloride or ammonium chloride, an aminoplast which has been reacted with formaldehyde and optionally then been etherified, as the finishing agent, an anti-migration agent and conventional wetting agents and anti-foaming agents.

Suitable, from 1 to 5 per cent by weight, and preferably from 1.5 to 3 per cent by weight, based on the weight of liquor, of the alkylene oxide derivatives of the invention are added to this type of pigment/finishing liquor.

Dispersions of film-forming copolymers which can be used for the special one-bath pigment dyeing and finishing which employs the agents according to the invention are described, e.g., in German Printed Applications 1,047,431, 1,110,606 and 1,209,989, German Patent 1,255,628 and U.S. Pat. Nos 2,719,072, 2,780,608 and 3,100,674.

The Examples which now follow illustrate the invention with regard to the manufacture and use of the new alkylene oxide derivatives. The parts are parts by weight.

EXAMPLE 1

50 parts of ethylene oxide are added dropwise to a solution of 30 parts of an oxo-alcohol of 9 to 11 carbon atoms in 100 parts of tetrahydrofuran and 1.5 parts of $BF_3$-etherate at 80° C and atmospheric pressure, and the mixture is stirred at 100° C for 30 minutes. 175.5 parts of reaction product are freed from unconverted tetrahydrofuran at 15 mm Hg. Yield: 145 parts of a colorless oil. To distil off unconverted oxo-alcohol, 145 parts of product are heated to 130° C at 0.1 mm Hg. Weight loss: 0.5 part, i.e. the alcohol has been converted virtually completely.

OH number: — 71.5
Acid number: — 0.8
MW determination (MW = molecular weight): — 724
MW (calculated from the OH number): — 783

If it is assumed that all the ethylene oxide and tetrahydrofuran have undergone addition reaction with the alcohol, the calculated MW is 763.

In the text which follows, ethylene oxide is referred to as "EO" and tetrahydrofuran as THF.

EXAMPLE 2

The reaction is carried out as in Example 1, with the following data: 50 parts of EO are added dropwise to 30 parts of an oxo-alcohol of 9 to 11 carbon atoms, 100 parts of THF and 1.5 parts of $BF_3$-etherate at 80° C. 170 parts of colorless oil are obtained as the reaction product.

These 170 parts yield 126 parts at 15 mm Hg and 60° C, and this weight remains constant even at 0.1 mm Hg and 130° C.

OH number: — 91
Acid number: — 0.8
MW determination: — 593
MW (calculated from the OH number): — 615
MW (calculated from alcohol employed): — 663

EXAMPLE 3

The reaction is carried out as in Example 1.

75 parts of EO are added dropwise to 50 parts of an oxoalcohol of 9 to 11 carbon atoms, 100 parts of THF and 1.5 parts of $BF_3$—etherate at 80° C. 223.5 parts of a colorless oil are obtained as the reaction product.

These 223.5 parts yield 186.7 parts at 15 mm Hg and 60° C, and this weight remains constant even in a high vacuum at 130° C.

OH number: — 96.5
Acid number: — 1.7
MW determination: — 580
MW (calculated from the OH number): — 590
MW (calculated from alcohol employed): — 620

EXAMPLE 4

100 parts of EO are added dropwise to 30 parts of stearyl alcohol in 100 parts of THF and 1.5 parts of $BF_3$-etherate at 80° C. The mixture is then stirred for 30 minutes and the unconverted THF is removed at 15 mm Hg and 60° C. Yield: 227 parts of a yellowish semi-fluid product. OH number: 34.5.

EXAMPLE 5

68 parts of EO are injected, in the course of 2 hours, into an autoclave containing 36.5 parts of oleic acid hydroxyethyl ester and 1.5 parts of $BF_3$-etherate in 105 parts of THF at from 60 to 70° C, and the mixture is then stirred for 30 minutes at 100° C. 215 parts of reaction product are obtained and are concentrated at 15 mm Hg and 60° C. Yield: 184 parts of a yellowish liquid.

MW determination: — 969
OH number: — 46.5

EXAMPLE 6

100 parts of EO are added dropwise to 30 parts of oleic acid in 100 parts of THF and 1.5 parts of $BF_3$-etherate at 70° C and the mixture is then stirred for 30 minutes at 100° C and concentrated at 15 mm Hg and 60° C. Yield: 120 parts of a yellowish oil.

OH number: — 37.5
Acid. number: — 5.6

EXAMPLE 7

The formation of a deposit on the rollers is tested using a liquor conventionally employed for one-bath pigment dyeing and finishing. This liquor consists of 80 parts of a 40% strength aqueous dispersion of a polymer of 90% of n-butyl acrylate, 7% of acrylonitrile, 2.5% of 3-chloro-2-hydroxypropyl acrylate and 0.5% of acrylamide as the pigment binder; 80 parts of a 50% strength aqueous solution of dimethylol-4,5-dihydroxyethyleneurea as the crosslinking agent; 12 parts of the blue pigment C.I. 74,160; 5 parts of a mixture of 50 parts of the tallow fatty acid ester of an addition product of 40% of ethylene oxide to polypropylene glycol of molecular weight 2,500, 40 parts of an addition product of 40 moles of ethylene oxide to 1 mole of castor pil and 10 parts of water, as an anti-foaming agent; 12 parts of magnesium chloride hexahydrate, as the catalyst; 15 parts of the addition product of 40 moles of propylene oxide to 1 mole of polyethylene glycol of molecular weight 1,800, as an anti-migration agent; 25 parts of the product prepared according to Example 5; and 771 parts of water.

450 parts of the liquor are introduced into the box of a padder. The padder has two horizontal rollers of 9 cm diameter and 15 cm length and is driven electrically via a PIV gearbox. The roller pressure is applied by means of a 35 cm long lever arm from the end of which is suspended a lead weight of approx. 12 kg. The hardness of the padder rollers is 72° Shore (drive roller) and 84° C Shore hardness (pressure roller).

An endless cotton fabric 12 cm wide and 56 cm long is allowed to run for 30 minutes, at about 12 m/min, through the liquor and, from below, into the nip. The deposit on the rollers is transferred onto paper by very slowly passing a double layer of paper, soaked in perchloroethylene, between the rollers under pressure. The two strips of paper are dried in air and the deposit on the rollers is rated from 1 (poor) to 5 (very good).

The products of the invention, according to Examples 1 to 6, excellently counteract the formation of a deposit on the rollers. It is found that the formation of a deposit on the rollers is improved from rating 1 to 2 (without using a product to counteract the formation of a deposit) to rating 4 (with the products of the invention). When using a copolymer with a weight ratio of oleic acid: ethylene oxide:tetrahydrofuran = 1:1.7:2.8, even a rating of 4 to 5 is achieved, which means that formation of a deposit on the rollers was prevented virtually completely.

In order to test the fastness to crocking, light and washing, a 100% rayon fabric weighing 112 g/m², a 100% cotton fabric weighing 118 g/m², a 50:50 polyester/cotton union fabric weighing 107 g/m², and a polyester/cotton union fabric (136 g/m²) containing 67% of polyester were dyed and finished with the liquor described above. No adverse effects resulting from the use of the agents prepared in Examples 1 to 6 on the fastness properties of the finished goods are detectable.

The products also have no adverse effects on the foaming of the finishing liquor; on the contrary, they slightly reduce the amount of foaming.

The agents to be employed according to the invention furthermore stabilize the dyeing and finishing liquor. After several hours, there is no detectable sediment attributable to dyestuff agglomeration (as tested by running a sample over filter paper).

The products also have a very favorable effect on the hand of the goods, which becomes substantially softer and more elegant.

We claim:

1. A polyalkylene oxide adduct of the formula

R — X wherein R is the radical of a monoalcohol of 8 to 22 carbon atoms, of a monocarboxylic acid of 8 to 22 carbon atoms or of their oxalkylation products with from 1 to 20 moles of an epoxide of 2 to 3 carbon atoms and X is the radical of a copolymer of an epoxide of 2 or 3 carbon atoms and tetrahydrofuran, with the proviso that the total amount of epoxide and tetrahydrofuran units in R—X is from 60 to 95 per cent by weight and that the molar ratio of epoxide units to tetrahydrofuran units is from 1:0.5 to 1:3.

2. A polyalkylene oxide adduct as claimed in claim 1, wherein R is an oleic acid radical and the starting materials oleic acid, ethylene oxide and tetrahydrofuran are incorporated into the end product R — X in the weight ratio of 1 : (1.5 to 2.5) : (1.5 to 3).

3. A polyalkylene oxide adduct as claimed in claim 1 wherein R is the polyethylene oxide adduct of oleic acid.

4. A polyalkylene oxide adduct as claimed in claim 1 wherein R is the polyethylene oxide adduct of oleic acid hydroxyethyl ester.

5. A polyalkylene oxide adduct as claimed in claim 1 wherein R is the polyethylene oxide adduct of an oxalcohol of 9 to 11 carbon atoms.

6. A polyalkylene oxide adduct as claimed in claim 1 wherein R is the polyethylene oxide adduct of stearyl alcohol.

7. A polyalkylene oxide adduct as claimed in claim 1 wherein the total amount of epoxide and tetrahydrofuran units in R—X is from 70 to 90 per cent by weight.

8. A polyalkylene oxide adduct as claimed in claim 1 in which there are from 5 to 20 moles of expoxide and from 5 to 15 moles of tetrahydrofuran per mole of the alcohol or carboxylic acid.

9. A polyalkylene oxide adduct as claimed in claim 8 wherein the expoxide is ethylene oxide.

10. A polyalkylene oxide adduct as claimed in claim 2 wherein said weight ratio is 1:(1.6 to 1.8): (2.0 to 3).

* * * * *